United States Patent [19]

Kitahara et al.

[11] Patent Number: 6,037,413
[45] Date of Patent: Mar. 14, 2000

[54] POLYESTER, PROCESS FOR THE PRODUCTION OF THE SAME, RESIN OR RUBBER COMPOSITIONS CONTAINING THE SAME, AND MOLDINGS OF THE COMPOSITIONS

[75] Inventors: Shizuo Kitahara, Kawaguchi; Shinya Ikeda, Kawasaki, both of Japan

[73] Assignee: Nippon Zeon Co, Ltd., Tokyo, Japan

[21] Appl. No.: 09/171,290

[22] PCT Filed: Apr. 16, 1997

[86] PCT No.: PCT/JP97/01313

§ 371 Date: Dec. 16, 1998

§ 102(e) Date: Dec. 16, 1998

[87] PCT Pub. No.: WO97/39046

PCT Pub. Date: Oct. 23, 1997

[30] Foreign Application Priority Data

| Apr. 16, 1996 | [JP] | Japan | 8-118487 |
| Apr. 16, 1996 | [JP] | Japan | 8-118488 |
| Sep. 5, 1996 | [JP] | Japan | 8-254009 |

[51] Int. Cl.$^7$ ...................................... C08F 8/00
[52] U.S. Cl. ........................ 525/168; 528/272; 528/302; 528/308; 525/437; 525/445
[58] Field of Search ................... 528/272, 302, 528/308; 525/168, 437, 445

[56] References Cited

U.S. PATENT DOCUMENTS

| 5,620,801 | 4/1997 | Binns et al. | 428/482 |
| 5,780,399 | 7/1998 | Ishikawa et al. | 508/452 |

FOREIGN PATENT DOCUMENTS

| 49-096020A | 9/1974 | Japan . |
| 49-096022A | 9/1974 | Japan . |
| 49-96020A | 9/1974 | Japan . |
| 49-96022A | 9/1974 | Japan . |
| 51-117796 | 10/1976 | Japan . |
| 8-48792 | 2/1996 | Japan . |
| 8048792A | 2/1996 | Japan . |
| 08217864 | 8/1996 | Japan . |
| 8-217864A | 8/1996 | Japan . |

*Primary Examiner*—Samuel A. Acquah
*Attorney, Agent, or Firm*—Birch, Stewart, Kolasch, & Birch, LLP

[57] ABSTRACT

A polyester having a hydroxyl value of at least 30 mg KOH/g and a weight average molecular weight (Mw) of preferably from 1,000 to 500,000 and prepared by polycondensation of a polycarboxylic acid ingredient predominantly comprised of an aromatic dicarboxylic acid and a polyhydric alcohol ingredient predominantly comprised of a hindered alcohol. This polyester is suitable for modifying a resinous or rubbery polymer.

8 Claims, No Drawings

POLYESTER, PROCESS FOR THE PRODUCTION OF THE SAME, RESIN OR RUBBER COMPOSITIONS CONTAINING THE SAME, AND MOLDINGS OF THE COMPOSITIONS

This application is the national phase under 35 U.S.C. §371 of prior PCT International Application No. PCT/JP97/01313 which has an International filing date of Apr. 16, 1998 which designated the United States of America, the entire contents of which are hereby incorporated by reference.

TECHNICAL FIELD

This invention relates to a polyester which has excellent compatibility with a resinous or rubbery polymer and is useful for improving coatability and adhesion of a resinous or rubbery polymer by incorporating the polyester therein; a process for producing the polyester; a composition comprising the polyester and the resinous or rubbery polymer; and a shaped article made of the composition.

BACKGROUND ART

Olefin resins such as polypropylene and olefin rubbers such as an ethylene-propylene copolymer rubber have excellent physical properties and are relatively inexpensive, and therefore, are widely used. However, olefin resins and rubbers do not have a polar group in the molecule, and a coating film and an adhered layer, formed thereon, have a poor adhesive force to the resins and rubbers, and thus a practically acceptable bond strength is difficult to obtain.

To solve the above-mentioned problems of olefin resins, proposals have been made of incorporating in the olefin resins modifiers such as a polycarbonate diol (Japanese Publication of Unexamined Patent Application [abbreviated to "JP-A"] No. H6-172596) and a diol-terminated polyetherester prepared by a ring-opening polymerization of a lactone such as $\alpha$-caprolactone, with ethylene glycol (JP-A H6-116472) whereby the surfaces of olefin resin articles are modified. The modifiers used have a problem such that they do not have a sufficient compatibility with the olefin resins and the coating properties are not improved to a satisfying extent.

To solve the problems of olefin rubbers, proposals have been made of incorporating in the olefin rubbers modifiers such as a polyhydroxypolybutadiene such that at least 98% of the double bonds have been hydrogenated (Japanese Publication of Examined Patent Application [abbreviated to "JP-B"] No. S57-6462), a hydroxyl-terminated hydrocarbon polymer such as a polyhydroxypolyolefin (JP-A H1-197534), and a low-molecular-weight polyisoprene such that at least 50% of the double bonds have been hydrogenated (JP-A H2-69545). However, the modifier-incorporated olefin rubbers still exhibit a poor adhesive force to a coating.

Recently the present inventors have found that a polyester with a hydroxyl value of at least 30 mgKOH/g, prepared by a polycondensation of a polycarboxylic acid predominantly comprised of a dimer acid of polymerized fatty acid with a polyhydric alcohol, exhibits an excellent compatibility with resinous polymers such as an olefin resin, and a greatly enhanced coatability, and filed a patent application (Japanese Patent Application No. H7-51955). However, the polyester derived from a polycarboxylic acid predominantly comprised of a dimer acid of polymerized fatty acid is generally liquid and has a poor handling property. It is thus desired to provide a modifier for modifying resinous or rubbery polymers, which has a high softening point and is capable of being handled in a solid form, and has excellent compatibility with the resinous or rubbery polymers and coatability.

DISCLOSURE OF INVENTION

An object of the present invention is to provide a novel polyester which is capable of improving the coatability and adhesion of a resinous or rubbery polymer by incorporating the polyester in the resinous or rubbery polymer, and which has a high softening point and a good handling property; and further to provide a process for producing the polyester.

Another object of the invention is to provide a shaped article made of a resinous or rubbery polymer and having improved coatability and adhesion; and a resin or rubber composition used for the preparation of the shaped article.

In one aspect of the present invention, there is provided a modifier for a resinous or rubbery polymer, which comprises as an effective ingredient a polyester having a hydroxyl value of at least 30 mgKOH/g and prepared by polycondensation of a polycarboxylic acid ingredient comprising 50 to 100% by weight of an aromatic dicarboxylic acid or a functional derivative thereof and a polyhydric alcohol ingredient comprising 40 to 100% by weight of a hindered glycol represented by the following formula:

$$HOCH_2\text{—}C(R^1R^2)\text{—}CH_2OH \quad (1)$$

wherein $R^1$ and $R^2$ represent an alkyl group, and the sum of the carbon numbers in $R^1$ and $R^2$ is in the range of 3 to 20.

In another aspect of the present invention, there is provided a polymer composition comprising a resinous or rubbery polymer and 0.01 to 50 parts by weight, based 100 parts by weight of the resinous or rubbery polymer, of the above-mentioned modifier for a resinous or rubbery polymer.

In still another aspect of the present invention, there is provided a polyester having a hydroxyl value of at least 60 mgKOH/g and a weight average molecular weight (Mw) of from 4,000 to 100,000 and prepared by polycondensation of a polycarboxylic acid ingredient comprising 50 to 100% by weight of an aromatic dicarboxylic acid or a functional derivative thereof and a polyhydric alcohol ingredient comprising 40 to 100% by weight of a hindered glycol represented by the following formula:

$$HOCH_2\text{—}C(R^1R^2)\text{—}CH_2OH \quad (1)$$

wherein $R^1$ and $R^2$ represent an alkyl group, and the sum of the carbon numbers in $R^1$ and $R^2$ is in the range of 3 to 20.

In a further aspect of the present invention, there is provided a polyester having a hydroxyl value of at least 30 mgKOH/g, a weight average molecular weight (Mw) of from 1,000 to 500,000, and an average hydroxyl group number (m) per molecule of at least 5, as determined by the following formula:

$$m = (\text{hydroxyl value} \times \text{weight average molecular weight})/(56.1 \times 1,000)$$

and prepared by polycondensation of a polycarboxylic acid ingredient comprising 50 to 100% by weight of an aromatic dicarboxylic acid or a functional derivative thereof and a polyhydric alcohol ingredient comprising 40 to 100% by weight of a hindered glycol represented by the following formula:

$$HOCH_2\text{—}C(R^1R^2)\text{—}CH_2OH \quad (1)$$

wherein $R^1$ and $R^2$ represent an alkyl group, and the sum of the carbon numbers in $R^1$ and $R^2$ is in the range of 3 to 20.

In a further aspect of the present invention, there is provided a process for producing a polyester wherein a polycarboxylic acid ingredient and a polyhydric alcohol are polycondensed, characterized in that the polycarboxylic acid ingredient comprises 50 to 100% by weight of an aromatic carboxylic acid or a functional derivative thereof, and the polyhydric alcohol ingredient comprises 40 to 100% by weight of a hindered glycol represented by the following formula:

(1)

wherein $R^1$ and $R^2$ represent an alkyl group, and the sum of the carbon numbers in $R^1$ and $R^2$ is in the range of 3 to 20; and, 0.1 to 60% by weight, based on the total weight of the polycarboxylic acid and the polyhydric alcohol ingredient, of at least one tri- or more-valent monomer selected from tri- or more-carboxylic acids or functional derivatives thereof and tri- or more-hydric alcohols, in addition to the aromatic dicarboxylic acid or the functional derivative thereof and the hindered glycol, is polycondensed.

In a further aspect of the present invention, there is provided a shaped article made of the above-mentioned polymer composition and having a coating formed on the surface thereof.

BEST MODE FOR CARRYING OUT THE INVENTION

Polyester

The polyester of the present invention is obtained by polycondensation of a polycarboxylic acid comprising an aromatic dicarboxylic acid or a functional derivative thereof as the main component and a polyhydric alcohol comprising a hindered glycol represented by the following formula:

(1)

wherein $R^1$ and $R^2$ represent an alkyl group, and the sum of the carbon numbers in $R^1$ and $R^2$ is in the range of 3 to 20, as the main component.

The polycarboxylic acids used in the present invention comprises 50 to 100% by weight of an aromatic dicarboxylic acid or a functional derivative thereof.

As specific examples of the aromatic dicarboxylic acid, there can be generally used those having one aromatic ring as a basic structure, but it can be those having two or three aromatic rings separately in a form such as biphenyl, p-terephenyl, diphenylmethane, triphenylmethane, and stylbene in the structure, or those having two or three aromatic rings which form a fused ring such as naphtalene, anthracene, and phenanthrene. Further, an aromatic dicarboxylic acid having a fused ring consisting of an aromatic ring with a five-membered or six-membered ring such as indene or tetralin can also be used. The number of carbons in the aromatic ring is usually in the range of 8 to 30, preferably 8 to 20, and more preferably 8 to 15.

As examples of the functional derivative of the aromatic dicarboxylic acid, there can be mentioned, an acid halide, an acid anhydride and an ester. Of these, an aromatic dicarboxylate is preferable, and lower alkyl esters thereof such as methyl ester, ethyl ester, propyl ester, isopropyl ester, butyl ester, amyl ester and hexyl ester are especially preferable.

The positions of two carboxyl groups are not particularly limited unless such substitution inhibits the polycondensation reaction with a polyol.

The aromatic dicalboxylic acid may have substituents in addition to carboxyl groups unless the substituents inhibit the polycondensation reaction with a polyol. As examples of the substituents, there can be mentioned tertiary amino groups substituted by lower alkyl groups (hereinafter, the term "lower" means that the number of carbon atoms is in the range of 1 to 6) such as methyl, ethyl, propyl, isopropyl, butyl, and amyl; a nitro group; a cyano group; a carbamoyl group; halogen atom such as fluorine and chlorine; lower alkyl groups such as methyl, ethyl, propyl, and isopropyl; lower alkoxy groups such as methoxy and ethoxy; and halogenized lower alkyl groups such as trifluoromethyl.

As specific examples of the aromatic dicarboxyric acid and the functional derivative thereof (the aromatic dicarboxylic acid and the functional derivative thereof are collectively referred to as "aromatic dicarboxylic acid type monomer"), there can be mentioned terephthalic acid, isophthalic acid, naphthalene-2,6-dicarboxylic acid, naphthalene-1,4-dicarboxylic acid, naphthalene-2,3-dicarboxylic acid and esters thereof. Of these, terephthalic acid, isophthalic acid and lower alkyl esters thereof are especially preferable.

These aromatic dicarboxylic acid type monomers may be used alone or as a combination of at least two thereof.

The amount of the aromatic dicarboxylic acid type monomers varies depending upon the particular use, but are usually in the range of 50 to 100% by weight, preferably 70 to 100% by weight, and more preferably 80 to 100% by weight, based on the total weight of the polycarboxylic acid monomers. When the amount is in the above-mentioned range, the softening point of the polyester becomes high to a desired extent.

As the remainder other than the aromatic dicarboxylic acid type monomers in the polycarboxylic acid components, other dicarboxylic acid type monomers including other dicarboxylic acids and the functional derivatives thereof, and tri- or more-valent carboxylic acid type monomer including other tri- or more-valent carboxylic acid or the functional derivative thereof, which are used for general polyester synthesis can be used without any limitation.

As specific examples of the other dicarboxylic acid type monomers, there can be mentioned other dicarboxylic acids such as succinic acid, glutaric acid, adipic acid, maleic acid, itaconic acid, pimelic acid, methylmalonic acid, suberic acid, azelaic acid, sebacic acid, brasillic acid, cyclohexane-1,2-dicarboxylic acid, cyclohexane-1,3-dicarboxylic acid, cyclohexane-1,4-dicarboxylic acid, polyalkenyl succinate, dimer acids of polymerized fatty acid (hereinafter, referred to as "dimer acid"), hydrogenated dimer acids and lower alkyl esters thereof. These other dicarboxylic acids may be employed alone or as a combination of at least two thereof.

As specific examples of tri- or more-carboxylic acid type monomers, there can be mentioned, tri- or more-carboxylic acids such as trimellitic acid, tricarballylic acid, trimesic acid, and trimer acids of polymerized fatty acid, and lower alkyl esters thereof.

Provided that the object of the present invention is not injured, in addition to the polycarboxylic acid or the functional derivative thereof, monocarboxylic acids or esters thereof can be used, which include, for example, formic acid, acetic acid, butyric acid, 2-methylpropionic acid, valeric acid, isooctylic acid, isonanoic acid, lauric acid, myristic acid, palmitic acid, stearic acid, isostearic acid, arachic acid, linoleic acid, oleic acid, elaidic acid, tolufatty acid, and esters thereof.

These monocarboxylic acids or esters thereof are usually used in an amount of not larger than 20% by weight, preferably not larger than 10% by weight, and more preferably not larger than 5% by weight, based on the total weight of the carboxylic acid components.

The polyhydric alcohol component used in the present invention comprises a hindered glycol monomer as the main component. The hindered glycol used in the present invention is not particularly limited provided that it is generally used for polyester synthesis, and is compounds represented by the following general formula (1):

$$HOCH_2-C(R^1R^2)-CH_2OH \qquad (1)$$

wherein, $R^1$ and $R^2$ independently represent an alkyl group. The number of carbon atoms in the alkyl group is not particularly limited, but is usually in the range of 2 to 10, preferably 2 to 6. The sum of the number of carbon atoms in $R^1$ and $R^2$ is in the range of 3 to 20, and preferably 3 to 10. When the carbon number in the alkyl group is in this range, the compatibility with a resin and rubber and the coating property become better. As examples of the alkyl group $R^1$, there can be mentioned methyl, ethyl, propyl, isopropyl, butyl, isobutyl, sec-butyl, amyl, hexyl, heptyl, octyl, nonyl, decyl, dodecyl, tridecyl, pentadecyl, octadecyl, and eicosyl. Of these, ethyl, propyl, isopropyl, butyl, isobutyl, sec-butyl, amyl, hexyl, heptyl, octyl, nonyl and decyl group are preferable, and ethyl, propyl, butyl, amyl, hexyl, heptyl, octyl, nonyl and decyl group are especially preferable.

As examples of preferable hindered glycol, there can be mentioned 2,2-diethyl-1,3-propanediol, 2,2-dipropyl-1,3-propanediol, 2,2-diisopropyl-1,3-propanediol, 2,2-dibutyl-1,3-propanediol, 2,2-diiso-butyl-1,3-propanediol, 2-methyl-2-dodecyl-1,3-propanediol, 2-ethyl-2-butyl-1,3-propanediol and 2-propyl-2-pentyl-1,3-propanediol. Of these, 2,2-diethyl-1,3-propanediol, 2,2-dipropyl-1,3-propanediol, 2,2-dibutyl-1,3-propanediol, 2-ethyl-2-butyl-1,3-propanediol and 2-propyl-2-pentyl-1,3-propanediol are especially preferable.

The hindered glycol may be used alone or in combination. The amount of the hindered glycol in the total polyhydric alcohol component is in the range of 40 to 100% by weight, preferably 55 to 100% by weight, and more preferably 70 to 100% by weight, based on the total weight of polyols. If the amount of the hindered glycol is too small, it is not preferable that the compatibility with a resin or rubber and the coating property are poor.

In addition to the hindered glycol, other diols and/or tri- or more-hydric alcohol may be used as the polyol components. As examples of the diols, there can be mentioned alkanediols, cycloalkanediols, aromatic diols, oligooxyalkylene glycols, polyoxyalkylene glycols, and hihdered glycols. Of these, alkanediols and cyclroalkanediols are preferable, and these diols may be used alone or in combination.

As specific examples of the alkanediol, there can be mentioned ethylene glycol, propylene glycol, 1,2-butanediol, 1,4-butanediol, 1,6-hexanediol, 3-methyl-1,5-pentanediol, 1,8-octanediol and 1,9-nonanediol. Of these, alkanediols having 4 to 9 carbon atoms such as 1,4-butanediol, 1,6-hexanediol, 3-methyl-1,5-pentanediol, 1,8-octanediol and 1,9-nonanediol are preferable.

As specific examples of the cycloalkanediol, there can be mentioned cyclopentane-1,2-diol, cycrohexane-1,3-diol, cyclohexane-1,4-diol, cyclooctane-1,4-diol and 2,6-norbornane diol.

As specific examples of the aromatic diol, there can be mentioned p-xylenediol, 4,4'-methylenediphenol, 4,4'-dihydroxybiphenyl and 2,5-naphthalene diol.

As specific examples of the oligooxyalkylene glycol and polyoxyalkylene glycol, there can be mentioned those which are prepared by polymerization by the conventional procedure of a single monomer or a mixed monomer of alkylene oxides such as ethylene oxide, propylene oxide and butylene oxide, and which are represented by the following general formula (2):

$$HO-((CH_2)_a-CHR^3O)_b-H \qquad (2)$$

wherein, $R^3$ is a hydrogen atom, or a lower alkyl group such as methyl or ethyl, and preferably a hydrogen atom or a methyl group. The number "a" represents an integer from 1 to 6, preferably from 1 to 4. The number "b" represents an integer from 2 to 100, preferably 2 to 50, and more preferably 2 to 25. As the specific examples, there can be mentioned oligooxyalkylene glycols such as diethylene glycol, triethylene glycol, tetraethylene glycol, dipropylene glycol and tripropylene glycol; and polyoxyalkylene glycols such as polyethylene glycol, polypropylene glycol and polybutylene glycol.

The tri- or more-hydric alcohols are not particularly limited provided that they have at least three hydroxyl groups. As the specific examples of the tri- or more-hydric alcohol, there can be mentioned glycerol compounds such as glycerol, diglycerol and polyglycerol; sugars such as sorbitol, gulucose, mannitol, sucrose and dextrose; and ditrimethylolpropane and dipentaerythritol.

As the tri- or more-hydric alcohols, hindered alcohols represented by the following general formula (3),

$$HOCH_2-C(R^4R^5)-CH_2OH \qquad (3)$$

can be employed; wherein, $R^4$ and $R^5$ independently represent an alkyl group or hydroxyalkyl group, and at least one of $R^4$ and $R^5$ is a hydroxyalkyl group. The number of carbon atoms in the alkyl group is not particularly limited, but usually in the range of 1 to 50, prefereably 1 to 20, and more preferably 2 to 10. As specific examples of such hindered alcohols, there can be mentioned trimethylolethane, trimethylolpropane, trimethylolbutane and pentaerythritol. These tri- or more-hydric alcohol may be employed alone or in combination.

Provided that the object of the present invention is not injured, a monohydric alcohol can be used in addition to the polyhydric alcohol, which includes, for example, such as methanol, ethanol, isopropanol, butanol, t-butanol, neopentyl alcohol, 3-methyl-3-pentanol, 3-ethyl-3-pentanol, 2,3,3-trimethyl-2-butanol, 1-decanol and nonyl alcohol. The amount of these monohydric alcohols are usually not larger than 20% by weight, preferably not larger than 15% by weight, and more preferably not larger than 10% by weight, based on the total weight of alcohols.

It is desirable to use at least one monomer selected from the group consisting of tri- or more-valent carboxylic acids, functional derivatives thereof and tri- or more-hydric alcohols, in addition to the aromatic dicarboxylic acid type monomer and hindered glycol. When these tri- or more-valent monomers are employed in combination, both the molecular weight of polyester and the hydroxyl value thereof are increased sufficiently and the compatibility with a resin and the coating performance can be highly balanced. The amount of the tri- or more-hydric monomers varies depending upon the particular use, but is usually in the range of 0.1 to 60% by weight, preferably 0.1 to 40% by weight, and more preferably 1 to 30% by weight, based on the total weight of monomers.

The polycondensation of the above-mentioned monomers is preferrably carried out under conditions such that the total number of hydroxyl groups (X) in the total monomers including the total polycarboxylic acids and the total polyhydric alcohols is larger than the total number of carboxylic acid reactive groups (Y). When the polycondensation is performed under these conditions, a polyester having a high molecular weight and a high hydroxyl value can be obtained. The equivalent ratio (X/Y) of the total number of alcoholic hydroxyl group (X) and the total number of carboxylic acid reactive group (Y) is usually at least 1.02, preferably 1.03 to 3.5, and more preferably 1.04 to 2.5, based on the equivalent weight ratio. The carboxylic acid reactive group used herein means carboxylic acid functional groups which can form ester bonds, and there can be usually mentioned carboxyl, ester, and acid anhydride groups.

The polycondensation is performed by the ordinary methods, for example, the reaction is preferably performed in a temperature range of 100 to 300° C., preferably 150 to 280° C. and especially preferably in the presence of inactive gas. If desired, a non-aqueous organic solvent which forms an azeotropic mixture with water, such as toluene or xylene, may be used, and the reaction may be performed at a reduced pressure, usually in the range of 0.1 to 500 mmHg, preferably 1 to 200 mmHg, and more preferably 10 to 100 mmHg.

When the esterification condensation is performed, a catalyst for esterification is usually employed. As examples of the catalyst for esterfication, there can be mentioned Brensted acid such as p-toluenesulfonic acid, sulfuric acid, and polyphosphate; organic metal compounds such as calcium acetate, zinc acetate, manganese acetate, zinc stearate, alkyltin oxide, dialkyltin oxide and titanium alkoxide; metal oxides such as tin oxide, antimony oxide, titanium oxide and vanadium oxide. An organic metal compound having a metal which belongs to group IV in the periodic table is preferable to obtain a polyester having good oxidative stability.

The polyester of the present invention is characterized as having a high hydroxyl value. The hydroxyl value is at least 30 mg KOH/g, preferably in the range of 40 to 250 mg KOH/g, and more preferably 60 to 200 mg KOH/g. When the hydroxyl value is in this range, the polyester has excellent coatability and the adhesion.

The molecular weight of the polyester varies depending upon the particular use, but it is usually in the range of 1,000 to 500,000, preferably 2,000 to 300,000 and more preferably 4,000 to 200,000, measured by gel permeation chromatography and expressed in terms of the standard polystyrene conversion weight-average molecular weight. If the molecular weight of the polyester is extremely small, the adhesive strength to a coating material formed on the surface of a shaped article becomes low. In contrast, the molecular weight of the polyester is extremely large, the coating property is not well improved because the polyester molecule do not readily migrates to the surface of the shaped article.

The polyester for modifying a resinous polymer is preferably those having a weight-average molecular weight (Mw) of usually 4,000 to 100,000, preferably 5,000 to 50,000 and more preferably 6,000 to 40,000, and a hydroxyl value of at least 60, preferably in the range of 65 to 200 and more preferably 70 to 150.

The polyester for modifying a rubbery polymer is preferably those having a weight-average molecular weight (Mw) of usually 1,000 to 500,000 and preferably 2,000 to 30,000, and a hydroxyl value of at least 30 mg KOH/g, preferably 40 to 250 mg KOH/g, and an average hydroxyl value per molecule, m, which is represented by the following equation:

$$m=(\text{hydroxyl value}\times\text{weight-average molecular weight})/(56.1\times1,000)$$

of at least 5, usually in the range from 20 to 200, preferably 30 to 150 and more preferably 40 to 100.

The softening point of the polyester is usually at least 30° C., preferably in the range from 30 to 300° C., more preferably 60 to 200° C. and most preferably 80 to 150° C., because the polyester is excellent in handling characteristics.

When the polyester of the present invention is oil-soluble, the compatibility with a resinous or rubbery polymer is well. The term "oil-soluble" means the light transmission of the polyester solution, which is measured as described below, is at least 70% and preferably at least 80%. More preferably the light transmission is at least 85%.

Five grams of the polyester is taken into 95 g of toluene, and the solution is stirred for 1 hour at 80° C. in nitrogen gas atmosphere, then the solution is cooled to room temperature, 20° C. This dilute toluene solution is allowed to stand for 24 hour in a thermo-hygrostat at 20° C., and then stirred again to measure light transmission by using turbidimeter (ANA-14S, Tokyo Koden Co. Ltd.). As a light source, a tungsten incandescent lump (6V, 6A) is used, and as a cell, a 20 mm square absorption cell is used. Light transmission is expressed in %, provided that it is 0% when the apparatus is closed with a shutter, and the light transmission of toluene itself is 100%.

Modifier for Resin and Rubber

The modifier of the present invention for modifying a resinous or rubbery polymer comprises the above-mentioned polyester as an active ingredient, and, if desired, additives generally used as the modifiers for resinous polymers and rubbery polymers may be incorporated.

As examples of the additives, there can be mentioned various additives such as stabilizers; natural and synthetic polymeric materials described in JP-A H7-268046; a fibrous reinforcing materials described in JP-A H7-268046; iron, chromium, nickel, cobalt and alloys thereof, and oxides thereof; plasticizers such as dimethyl phthalate, diethyl phthalate, dihexyl phthalate, butyl lauryl phthalate, di(2-ethylhexyl) phthalate, dilauryl phthalate, di-n-octyl phthalate, di-n-butyl adipate, diisooctyl adipate, di-2-ethyhexyl 4-thioazelate, diethyl sebacate, di-n-butyl maleate and diethyl maleate; colorants including inorganic pigments such as titanium oxide, zinc oxide, white lead, cupper suboxide, yellow iron oxide, iron black, cadmium yellow, molybdenum yellow, molybdenum red, vermilion, chromium yellow, chromium oxide, Prussian blue, carbon black, barium sulfate, alumina white, white carbon and red iron oxide, and organic pigments such as thioindigo red, phthalocyanine blue, quinacridone red quinophthalo-yellow condensed azo yellow and ultramarine; dispersants such as calcium stearate and magensium stearate; waxes such as polyethylene wax and polypropylene wax; electrical conductivity-imparting agents such as ferrite and kerosine black; antistatic agents including various surface active agents; blowing agent; crosslinkers; nucleating agents; fire redundants; and oils.

As the stabilizer among the above-mentioned additives, there can be antioxidant such as phenol type and sulfur type antioxidants; and UV absorbers such as hindered amine type, benzotriazole type and benzoate type UV absorbers.

As the phenol type antioxidant, known antioxidants may be used, which include for example, acrylate compounds described in the JP-A S63-179553 and JP-A H1-168423, such as 2-t-butyl-6-(3-t-butyl-2-hydroxy-5-methylbenzyl)-4-methylpehenyl acrylate, 2,4-t-amyl-6-(1-(3,5-di-t-amyl-2-hydroxyphenyl)ethyl)pehnyl acrylate; alkyl-substituted phenol type compounds such as 2,6-di-t-butyl-4-methylphenol, 6-di-t-butyl-4-ethylphenol, octadecyl-3-(3,5-di-t-butyl-4-hydroxyphenyl) propionate, 2,2'-methylene-bis(4-methyl-6-t-butylphenol), 4,4'-butylidene-bis(6-t-butyl-m-cresol), 4,4'-thiobis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy)-1,1-dimethylethyl)-2,4,8,10-tetraoxaspiro[5,5]undecane, 1,1,3- tris(2-methyl-4-hydroxy-5-t-butylphenyl)butane, 1,3,5-trimethyl-2,4,8-tris(3,5-di-t-butyl-4-hydroxybenzyl) benzene, tetrakis (methylene-3-(3',5'-di-t-butyl-4'-hydroxyphenyl)propionate) methane, triethyleneglycol bis (3-(3-t-butyl-4-hydroxy-5-methylphenyl)propionate) and tripherol; and triazine compounds such as 6-(4-hydroxy-3,5-di-t-butylanilino)-2,4-bis-octylthio-1,3,5-triazine, 6-(4-hydroxy-3,5-dimetylanilino)-2,4-bis-octylthio-1,3,5-triazine, 6-(4-hydroxy-3-methyl-5-t-butylanilino)-2,4-bis-octylthio-1,3,5-triazine and 2-octylthio-4,6-bis(3,5-di-t-butyl-4-oxyanilino)-1,3,5-triazine.

As the sulfur type antioxidant, there can be mentioned, for example, dilauryl 3,3'-thiodipropionate, dimyristyl 3,3'-thiodipropionate, distearyl 3,3'-thiodipropionate, laurylstearyl 3,3-thiodipropionate, pentaerythritol-tetrakis-(β-lauryl-thio-propionate), and 3,9-bis(2-dodecylthioethyl)-2,4,8,10-tetraoxaspiro[5,5]undecane.

As the hindered amine type UV absorber, there can be mentioned, for example, 2,2,6,6-tetramethyl-4-piperidyl benzoate, bis(2,2,6,6-tetramethyl-4-piperidyl) sebacate, bis (1,2,2,6,6-pentamethyl-4-piperidyl)-2-(3,5-di-t-butyl-4-hydroxybenzyl)-2-n-butyl malonate, and 4-(3-(3,5-di-t-butyl-4-hydroxyphenyl)propionyloxy)-1-(2-(3-(3,5-di-t-butyl-4-hydroxyphenyl)propionyloxy)ethyl)-2,2,6,6-tetramethylpiperidine.

As the benzotriazole type UV absorber, there can be mentioned, for example, compounds such as 2-(2-hydroxy-5-methylphenyl)benzotriazole, 2-(3-t-butyl-2-hydroxy-5-methylphenyl)-5-chlorobenzotriazole, 2-(3,5-di-t-butyl-2-hydroxyphenyl)-5-chlorobenzotriazole, and 2-(3,5-di-t-amyl-2-hydroxyphenyl)benzotriazole.

As the benzoate type UV absorber, there can be mentioned, for example, compounds such as 2,4-di-t-butylphenyl-3,5-di-t-butyl-4-hydroxybenzoate, and hexadecyl-3,5-di-t-butyl-4-hydroxybenzoate.

These stabilizers may be used alone or as a combination of at least two thereof. Provided that the object of the present invention is not injured, the amount of the stabilizers may be suitably chosen.

Resinous Polymers

The resinous polymer which is modified with the modifier of the present invention is not particularly limited. General thermoset resins and thermoplastic resins are employed, and preferably thermoplastic resins are used. As the thermoset resin, there can be mentioned, for example, a phenolic resin, a cresol resin, an urea resin, a melamine resin, a furan resin, an unsaturated polyester resin, an epoxy resin and an urethane resin. Of these, an unsaturated polyester resin, an epoxy resin and an urethane resin are preferable. As the thermoplastic resins, there can be mentioned, for example, an olefin resin, a styrene resin, an acrylic resin, a phenylene ether resin, an ester resin, a polycarbonate resin and general-purpose engineering plastics. Of these, a hydrocarbon type thermoplastic resin such as an olefin resin or a styrene resin, particularly an olefin resin, is especially preferable because the modification effect is prominently manifested.

As the olefin resin, for example, there can be mentioned a homopolymer of α-olefins such as ethylene, propylene, 1-butene, 1-pentene, 1-hexene and 4-methylpentene-1; a copolymer of two or more kinds of α-olefins such as ethylene and propylene or other α-olefins. Of these, (co) polymers of which main component is ethylene or propylene is preferable, and (co)polymers of which main component is propylene is especially preferable. As the (co)polymers of which main component is propylene, there can be mentioned polypropylene and propylene copolymers that include at least 50% by weight, preferably at least 70% by weight, and more preferably at least 90% by weight of propylene, and other α-olefins. As the α-olefin for copolymerization, ethylene is particularly preferable.

As other olefin resins, for example, there can be mentioned a graft copolymerization modified olefin resin which is prepared by graft-copolymerizing an α,β-unsaturated carboxylic acid such as acrylic acid or maleic acid or maleic anhydride onto the above-mentioned olefin resin; a block copolymerization modified olefin resin which is prepared by block-copolymerizing an α,β-unsaturated carboxylic acid such as acrylic acid or maleic acid or maleic anhydride with the above-mentioned olefin resin; and copolymers of α-olefin with other copolymerizable monomers, such as an ethylene-acrylic acid copolymer, an ethylene-methacrylic acid copolymer, an ethylene-crotonic acid copolymer, an ethylene-maleic acid copolymer, an ethylene-methyl methylacrylate copolymer and ethylene-vinyl acetate copolymer.

As the styrene resin, for example, there can be mentioned a polystyrene, an impact-resistant polystyrene, a styrene-acryronitlire copolymer, a styrene-alkyl (meth)acrylate copolymer, ABS resin, MBS resin, AAS resin, styrene-modified polyphenylene ether, styrene-butadiene block copolymer resin, styrene-isoprene block copolymer resin and hydrogenation product thereof.

Rubbery Polymer

A rubbery polymer which is modified with the polyester of the present invention is not particularly limited provided that the rubbery polymer is generally used. As the rubbery polymer, for example, there can be mentioned natural rubber, conjugated diene polymer rubbers such as polyisoprene rubber, polybutadiene rubber, butadiene-isoprene copolymer rubber and chloroprene rubber; aromatic vinyl-conjugated diene random copolymer rubbers such as a styrene-butadiene random copolymer rubber, a styrene-isoprene random copolymer rubber and a styrene-isoprene-butadiene random copolymer rubber; an aromatic vinyl-conjugated diene block copolymer rubber and its hydrogenation product; a copolymer rubber of a conjugated diene with a copolymerizable monomer, such as acryronitrile-butadiene copolymer rubber; modified polyethylene rubbers such as chlorinated polyethylene rubber and chlorosulfonated polyethylene rubber; olefin type copolymer rubbers and modified rubbers thereof, an acrylic rubber, silicone rubber and fluororubber. Of these, aromatic vinyl-conjugated diene random copolymer rubbers and hydrogenation products thereof, modified polyethylene rubbers, olefin type copolymer rubbers and modified rubbers thereof and silicone rubber are preferable, and olefin type copolymer rubbers are especially preferable.

The olefin type copolymer rubber is not particularly limited provided that it is a rubbery copolymer including in α-olefin such as ethylene, propylene, 1-butene, 1-pentene, 1-hexene, 3-methyl-1-butene or 4-methyl-1-pentene, but there can be especially mentioned copolymer rubbers including two or more kinds of α-olefins, or α-olefin and other copolymerizable monomers. The contents of α-olefin in the copolymer rubber is not particularly limited, but it is usually at least 50% by weight, preferably in the range from 60 to 100% by weight, more preferably 80 to 100% by weight. Other copolymerizable monomers are not particularly limited. However, there can be mentioned conjugated diene and non-conjugated diene, and non-conjugated dienes are preferable.

As the non-conjugated diene compound, there can be mentioned ethylidene norbornene, dicyclopentadiene and 1,4-hexadiene, and ethylidene norbornene is preferable. The content of these copolymerizable monomers in the copolymer is usually not larger than 40% by weight, preferably not larger than 30% by weight, and more preferably not larger than 20% weight.

As specific examples of the olefin type copolymer rubber, there can be mentioned ethylene-propylene copolymer rubber, ethylene-butene-1 copolymer rubber, propylene-butene-1 copolymer rubber, ethylene-propylene-conjugated diene copolymer rubber, isobutylene-conjugated copolymer rubber and ethylene-propylene-nonconjugated diene copolymer rubber. Of these, a butyl rubber (IIR), i.e., a copolymer rubber of isobutylene with 0.5 to 5% by mole of isoprene, and EPDM, i.e., ehtylene-propylene-diene copolymer rubber in which the diene is a non-conjugated diene such as ethylene norbornene, are preferable.

As the modified olefin copolymer rubber, there can be mentioned rubbers prepared by modifying the above-mentioned copolymer rubber with a polar compound. Specifically, there can be mentioned a chloride of the olefin type copolymer rubber, a chlorosulfonated product of the olefin type copolymer rubber, and a polar compound-grafted or added copolymer which is produced by graft polymerizing or adding a polar vinyl compound to the olefin type copolymer rubber. Of these, a chloride of the olefin type copolymer rubber, a chlorosulfonated product of the olefin type copolymer rubber and a polar vinyl compound-added olefin type copolymer rubber are preferable. The polar vinyl compounds include, for example, acrylic acid, methacrylic acid, crotonic acid, maleinic acid (or anhydride), acrylic acid esters and vinyl acetate.

The resinous polymers and the rubbery polymers may be used either alone or as a combination of at least two thereof. The amount of the above-mentioned polymer added to the resinous or rubbery polymer is suitably chosen depending upon the particular use or purpose of the polymer, but is usually in the range of 0.01 to 50 parts by weight, preferably 0.1 to 30 parts by weight and more preferably 1 to 25 parts by weight, based on 100 parts by weight of the resinous or rubbery polymer.

Polymer Composition

The polymer composition comprising a resinous or rubbery polymer and the polyester of the present invention is prepared by combining together these ingredients and optional inorganic filler and other additives according to the ordinary procedure. The ingredients may be mixed together either at once or in lots. The procedure of mixing in lots may be any of the following procedures: (1) a procedure of first mixing a resinous or rubbery polymer with the modifier for a resinous or rubbery polymer of the present invention, and then, incorporating optional inorganic filler and other additives in the mixture; and (2) a procedure of first mixing a resinous or rubbery polymer with an organic filler and other additives, and then, incorporating the modifier for a resinous or rubbery polymer of the present invention.

The mixing for the preparation of the polymer composition can be carried out by conventional procedure. For example, mixing is conducted first by using a Henschel mixer and then kneading or milling is conducted by using an extruder such as a single screw extruder or a twin screw extruder, a Banbury mixer, a Brabender plastometer, a plastomill, a calender, a kneader, a roll, a multi-screw kneader or a double helical ribbon mixer.

The filler incorporated includes, for example, calcium carbonate, calcium oxide, magnesium oxide, calcium hydroxide, magnesium hydroxide, aluminum hydroxide, magnesium carbonate, calcium silicate, magnesium silicate, calcium sulfate, barium sulfate, calcium sulfite, mica, dolomite, silica, clay, talc, carbon black, zinc oxide, glass fiber and carbon fiber. Of these, calcium carbonate, talc and carbon black are preferable.

In the present invention, surface-treated inorganic fillers are especially preferably used. The surface treatment may be carried out by a known manner. For example, the surface treatment is carried out by using a silane-type or titanium-type coupling agent, or an acid such as a higher fatty acid or an unsaturated organic acid. The particle diameter of the inorganic filler is not particularly limited, but the average particle diameter is usually not larger than 5 $\mu$m.

The inorganic filler may be used either alone or as a combination of at least thereof. The amount of the inorganic filler is suitably chosen depending upon the particular intended use, but is usually in the range of from 1 to 200 parts by weight, preferably 2 to 100 parts by weight and more preferably 5 to 50 parts by weight, based on 100 parts by weight of the resinous or rubbery polymer.

As the additives other than the inorganic filler, those are mentioned which are used as additives for the above-mentioned resinous and rubbery polymers. The additives for a rubbery polymer include, for example, a vulcanizing agent, a vulcanization accelerator, a vulcanization promoter and a dehydrating agent. These additives may be used either alone or in combination and the amount thereof can be suitably chosen provided that the effect of the invention is attained.

As specific examples of the vulcanizing agent, there can be mentioned sulfur-type vulcanizing agents such as sulfur, morpholine and disulfide, and peroxide-type vulcanizing agents such as dicumyl peroxide and di-t-butylperoxydiisopropylbenzene. The vulcanizing agent may be used either alone or as a combination of at least two thereof. The amount of the vulcanizing agent is usually in the range of 0.1 to 20 part by weight, preferably 0.5 to 10 parts by weight and more preferably 1 to 5 parts by weight, based on 100 parts by weight of the rubbery polymer.

As specific examples of the vulcanization accelerator, there can be mentioned mercaptobenzothiazole, zinc dimethyldithiocarbamate and tetramethyllithium sulfide. The amount of the vulcanization accelerator is usually in the range of 0.1 to 10 part by weight, preferably 0.5 to 5 parts by weight and more preferably 1 to 3 parts by weight, based on 100 parts by weight of the rubbery polymer.

Shaped Article

The above-mentioned polymer composition is shaped by an ordinary procedure to give a shaped polymer article exhibiting enhanced coatability and adhesion to a coating film. The type of shaped article is not particularly limited, and, as the shaping procedure, any known procedure of injection molding, blow molding, extrusion shaping, compression molding and rotational molding.

A vulcanized rubber shaped article of the present invention can be made by conventional procedure usually employed in the rubber industry. For example, first, the ingredients other than a vulcanizing agent are mixed together at a temperature of 60 to 150° C. for a period of 5 to 30 minutes by a Banbury mixer or a Brabender mixer, then, the mixture is kneaded together with a vulcanizing agent at a temperature not higher than 100° C. by a roll, and finally the kneaded mixture is shaped under heated conditions by an extruder or other molding machine.

The procedure by which the rubber mixture is vulcanized includes a procedure wherein the mixture is pressed by a press under heated conditions, a procedure wherein the mixture is heated by heated air in an oven, and a procedure wherein the mixture is heated by a high-frequency heater. The heated conditions involve a temperature of 100 to 250° C. and a period of 0.05 to 5 hours.

By coating the rubber shaped article, a coated shaped polymer article exhibiting enhanced film strength and solvent-resistance.

A coating material used is not particularly limited provided that it is generally used in industries. A specific examples of the coating material, there can be mentioned solvent-type thermoplastic acrylic or methacrylic coating materials, solvent-type thermoplastic acrylic or methacrylic coating materials, acrylic resin-modified alkyd resin coating materials, epoxy resin coating materials, acrylic-urethane resin coating materials, silicone-modified urethane resin coating materials, polyurethane coating materials, alkyd-melamine resin coating material, polyether-melamine resin coating materials, polyester-melamine resin coating materials and amine-alkyd resin coating materials. Of these, epoxy resin coating materials, acrylic-urethane resin coating materials, polyurethane coating materials, alkyd-melamine resin coating material, polyester-melamine resin coating materials and polyether melamine resin coating materials are preferable. Polyurethane coating materials, polyester-melamine resin coating materials and polyether melamine resin coating materials are especially preferable.

The shaped article can be coated with the coating material either directly as it is or, if desired, after it is subjected to a degreasing treatment by using, for example, warm water and/or a primer treatment. The coating procedure can be carried out by conventional procedure. For example, electrostatic coating, air-spray coating, brush coating and roller coating can be employed. The coating may be effected by conducting a prime-coating and then a final coating. The procedure of curing the coating film can be suitably chosen depending upon the material and shape of the shaped article, and the nature of the coating material. Usually natural drying, and heat-curing using heating means such as nickel chrome wire heater, infrared heater and high-frequency (UHF) heater can be employed.

The thickness of coating film can be varied depending upon the intended use of the shaped article and is not particularly limited, but is, as dry thickness, usually in the range of 1 to 500 μm, preferably 5 to 300 μm and more preferably 10 to 200 μm.

The shaped article of the present invention exhibit an enhanced adhesion, and various adhesives can be applied. As specific examples of the adhesive, there can be mentioned aqueous and non-aqueous epoxy adhesives, aqueous and non-aqueous urethane adhesives, aqueous and non-aqueous acrylic adhesives and cyanoacrylate instant adhesives. Of these, aqueous and non-aqueous epoxy adhesives and aqueous and non-aqueous urethane adhesives are preferable.

The application of an adhesive to the shaped article is conducted by, for example, spatura coating, air-spray coating, brush coating and roller coating. The procedure of curing the applied adhesive is suitably chosen depending upon the material and shape of the shaped article and the nature of the adhesive. Usually natural drying, and heat-curing using heating means such as nickel chrome wire heater, infrared heater and high-frequency (UHF) heater can be employed for the formation of a dry adhesive layer.

The thickness of adhesive layer can be varied depending upon the intended use of the shaped article and is not particularly limited, but is, as thickness after completion of adhesion, usually in the range of 1 to 2,000 μm, preferably 3 to 1,000 μm and more preferably 5 to 500 μm.

The invention will now be described by the following working examples that by no means limit the scope of the invention. In the following working examples, parts and % are by weight unless otherwise specified. Properties of polyesters and coating films were evaluated by the following methods.

(1) Weight Average Molecular Weight

The weight average molecular weight of a polyester was measured by gel permeation chromatography (GPC) and expressed in terms of that of the standard polystyrene.

(2) Hydroxyl Value and Acid Value

The hydroxyl value and acid value of polyesters were determined according to the following standards described in "Standard Methods for the Analysis of Oils, Fats and Derivatives" (Japan Oil Chemists' Society).

Hydroxyl value: 2.4.9.2–83

Acid value: 2.4.1–83

(3) Softening Point

The softening point of polyesters was measured by the ring and ball method according to JIS K2531.

(4) Compatibility with Resin and Appearance

The surface of a shaped article was visually examined and evaluated according to the following ratings.

A: Laminar separation was not observed

B: Laminar separation was observed (5) Adhesion of Coating Film on Rubber Shaped Article (5)-1 Bond Strength A gauze was adhered by using an instant adhesive on the coated surface of a rubber shaped article, and then, cut into a strip with a width of 1 cm. One end of the rubber shaped article and one end of the gauze were pulled in an opposite direction at an angle of 180° and a rate of 200 mm/min, and the maximum strength (in kgf/cm) required for separation was measured.

(5)-2 Adhesion (Cross Cut Test)

The cross cut adhesion test was conducted according to JIS K5400. The coated surface of a rubber shaped article was scored by drawing scored parallel eleven lines at an interval of 1 mm in each of the two perpendicular directions under a load of 350 kg to form a lattice pattern with 100 squares per cm². A self-adhesive tape with a width of 18 mm (supplied by Nichiban K.K.) was adhered on the lattice pattern under a load of 1,300 kg by using a pressing roller, and a peeling test was conducted at a peeling angle of 180°. The adhesion of the coating film was evaluated by the ratio (in %) of the number of squares remaining without separation per 100 squares.

(6) Adhesion of Coating Film on Resin Shaped Article (6)-1 Adhesion (Cross Cut Test)

The cross cut adhesion test was conducted according to JIS K5400. The coated surface of a resin shaped article was scored by drawing scored lines form a lattice pattern. A self-adhesive cellophane tape (supplied by Nichiban K.K.) was adhered on the lattice pattern, and a peeling test was conducted by pulling the adhered tape rapidly at a peeling angle of 90°. The adhesion of the coating film was evaluated by the ratio (in %) of the number of squares remaining without separation per 100 squares.

(6)-2 Solvent Resistance

A square sample having a size of 15×30 mm was cut from a coated resin shaped article and beveled. The sample was immersed in a gasohol (a mixture of gasoline/ethanol=90/10 by volume) at 23° C. The solvent resistance was expressed by the period of time (in minutes) from the commencement of immersion to the time at which partial separation of the coating film was observed.

PRODUCTION EXAMPLE 1

A 2,000 ml four-necked flask equipped with a stirrer, a thermometer, a reflux condenser, a water-separating tube and a nitrogen gas supplying tube was charged with 800 g of terephthalic acid, 770 g of 2-butyl-2-ethyl-1,3-propanediol, 72.7 g of pentaerythritol and 0.80 g of monobutyltin oxide as a catalyst (OH/COOH equivalent ratio=1.21).

Nitrogen gas was blown into the flask while the content was stirred. While water produced during a reaction was removed, the reaction was conducted at 220° C. for 3 hours, and further was continued at 240° C. for 6 hours. Thereafter the reaction product was dehydrated at a temperature of 240° C. and a reduced pressure of 200 mmHg, and then, the reaction was continued at a reduced pressure of 50 mmHg for 2 hours while unreacted diol was removed. The thus-obtained polyesterpolyol (referred to as "polyester A") had an average molecular weight of 44,020, an acid value of 0.35 mg KOH/g, a hydroxyl value of 66 mg KOH/g, a hydroxyl group number of 52 per molecule, a softening point of 105° C. and a light transmission of 92%.

PRODUCTION EXAMPLE 2

A 2,000 ml four-necked flask equipped with a stirrer, a thermometer, a reflux condenser, a water-separating tube and a nitrogen gas supplying tube was charged with 800 g of isophthalic acid, 734.8 g of 2-butyl-2-ethyl-1,3-propanediol, 69.4 g of pentaerythritol and 0.80 g of monobutyltin oxide as a catalyst (OH/COOH equivalent ratio=1.16).

Nitrogen gas was blown into the flask while the content was stirred. While water produced during a reaction was removed, the reaction was conducted at 220° C. for 3 hours, and further was continued at 240° C. for 6 hours. Thereafter the reaction product was dehydrated at a temperature of 240° C. and a reduced pressure of 200 mmHg, and then, the reaction was continued at a reduced pressure of 50 mmHg for 2 hours while unreacted diol was removed. The thus-obtained polyesterpolyol (referred to as "polyester B") had an average molecular weight of 61,600, an acid value of 0.38 mg KOH/g, a hydroxyl value of 38 mg KOH/g, a hydroxyl group number of 42 per molecule, a softening point of 101° C. and a light transmission of 89%.

PRODUCTION EXAMPLE 3

A 3,000 ml four-necked flask equipped with a stirrer, a thermometer, a reflux condenser, a water-separating tube and a nitrogen gas supplying tube was charged with 1,200 g of terephthalic acid, 1090.2 g of 2-butyl-2-ethyl-1,3-propanediol, 303.2 g of pentaerythritol and 1.20 g of monobutyltin oxide as a catalyst (OH/COOH equivalent ratio=1.27).

Nitrogen gas was blown into the flask while the content was stirred. While water produced during a reaction was removed, the reaction was conducted at 220° C. for 3 hours, and further was continued at 340° C. for 6 hours. Thereafter the reaction product was dehydrated at a temperature of 240° C. and a reduced pressure of 300 mmHg, and then, the reaction was continued at a reduced pressure of 50 mmHg for 2 hours while unreacted diol was removed. The thus-obtained polyesterpolyol (referred to as "polyester C") had an average molecular weight of 40,290, an acid value of 0.25 mg KOH/g, a hydroxyl value of 86 mg KOH/g, a hydroxyl group number of 62 per molecule, a softening point of 102° C. and a light transmission of 93%.

PRODUCTION EXAMPLE 4

A 2,000 ml four-necked flask equipped with a stirrer, a thermometer, a reflux condenser, a water-separating tube and a nitrogen gas supplying tube was charged with 800 g of terephthalic acid, 612.2 g of 2,2-diethyl-1,3-propanediol, 70.7 g of pentaerythritol and 1.10 g of dibutyltin oxide as a catalyst (OH/COOH equivalent ratio=1.18).

Nitrogen gas was blown into the flask while the content was stirred. While water produced during a reaction was removed, the reaction was conducted at 220° C. for 3 hours, and further was continued at 240° C. for 6 hours. Thereafter the reaction product was dehydrated at a temperature of 240° C. and a reduced pressure of 200 mmHg, and then, the reaction was continued at a reduced pressure of 50 mmHg for 2 hours while unreacted diol was removed. The thus-obtained polyesterpolyol (referred to as "polyester D") had an average molecular weight of 49,560, an acid value of 0.45 mg KOH/g, a hydroxyl value of 75 mg KOH/g, a hydroxyl group number of 66 per molecule, a softening point of 107° C. and a light transmission of 90%.

PRODUCTION EXAMPLE 5

A 2,000 ml four-necked flask equipped with a stirrer, a thermometer, a reflux condenser, a water-separating tube and a nitrogen gas supplying tube was charged with 800 g of terephthalic acid, 825.9 g of 2-butyl-2-ethyl-1,3-propanediol, 123.8 g of glycerol and 0.20 g of monobutyltin oxide as a catalyst (OH/COOH equivalent ratio=1.44).

Nitrogen gas was blown into the flask while the content was stirred. While water produced and unreacted diol were removed, the reaction was conducted at a temperature increasing from 200° C. to 240° C. for 6 hours, and thereafter the reaction was continued at a temperature of 240° C. and a reduced pressure of 50 mmHg for 3 hours while dehydration was conducted. The thus-obtained polyesterpolyol (referred to as "polyester E") had an average molecular weight of 13,200, an acid value of 0.35 mg KOH/g, a hydroxyl value of 108 mg KOH/g, a hydroxyl group number of 25 per molecule, a softening point of 85° C. and a light transmission of 95%.

EXAMPLES 1–4, COMPARATIVE EXAMPLE 1

Using the above-prepared polyesters A, B, C and E, rubber compositions were prepared according to the recipe shown in Table 1. The ingredients other than sulfur and the vulcanization accelerator for each rubber composition were mixed and kneaded together at 60° C. for 5 minutes by a 0.8 liter Banbury mixer. Then sulfur and the vulcanization accelerator were added to the kneaded mixture and the mixture was kneaded at 60° C. by a 6 inch roll. A unvulcanized rubber of a sheet form was taken out from the roll. The rubber sheet was introduced into an extruder having a diameter of 20 mm (Toyo Seiki K.K.) and extruded through the extruder at a die temperature of 60° C., a cylinder temperature of 50° C. and a rotor revolution number of 40 rpm to obtain an extrudate of a flat plate form. Simultaneously with the extrusion, a paint applied for glass run channel described in Comparative Example 1 in JP-A H7-150074 was coated to a thickness of 100 μm by a brush on the extruded flat plate. The coated flat plate was heated at 180° C. for 18 minutes in a Geer oven whereby vulcanization of the rubber and curing of the coating film were simultaneously conducted to prepare a testing specimen.

Bond strength of the coated rubber plate specimen was evaluated. For comparison, a flat sheet testing specimen was prepared by the same procedure as mentioned above except that polyester was not used, and bond strength thereof was similarly evaluated. The evaluation results are shown in Table 1.

TABLE 1

|  | Example | | | Comparative Exam. | Example |
| --- | --- | --- | --- | --- | --- |
|  | 1 | 2 | 3 | 1 | 4 |
| Rubber EPDM *1 | 100 | 100 | 100 | 100 | 100 |
| Carbon black (Seast 116) *2 | 140 | 140 | 140 | 140 | 140 |
| Oil (Diana Process PW380) *3 | 60 | 60 | 60 | 70 | 60 |
| Zinc oxide #1 | 5 | 5 | 5 | 5 | 5 |
| Stearic acid | 1 | 1 | 1 | 1 | 1 |
| Dehydrating (Vesta PP) *4 | 6 | 6 | 6 | 6 | 6 |
| Sulfur (325) | 1.00 | 1.00 | 1.00 | 1.00 | 1.00 |
| Vulcanization accelerator |  |  |  |  |  |
| MBT *5 | 1.00 | 1.00 | 1.00 | 1.00 | 1.00 |
| MBTS *6 | 1.00 | 1.00 | 1.00 | 1.00 | 1.00 |
| TMTD *7 | 0.75 | 0.75 | 0.75 | 0.75 | 0.75 |
| DPPTT *8 | 0.50 | 0.50 | 0.50 | 0.75 | 0.50 |
| Polyester | A | B | C | — | E |
|  | 10 | 10 | 10 |  | 10 |
| Bond strength (kgf/cm) | 1.2 | 1.2 | 1.1 | 0.2 | 0.8 |
| *9 | A | A | A | B | A |

*1 Mitsui Chemicals Inc., 3070
*2 Tokai Carbon Co., Ltd.
*3 Idemitsu Kosan Co., Ltd.
*4 Inoue Lime Co. Ltd.
*5 2-mercaptobenzothiazole
*6 dibenzothiazyl disulfide
*7 tetramethylthiuram disulfi4e
*8 dipentamethylenethiuram tetrasulfide
*9 After the peeling test, the state of separated coating film as observed. A is given to a sample exhibiting a surface rupture, and B is given to a sample wherein interface separation occurred.

EXAMPLES 5–8, COMPARATIVE EXAMPLE 2

Using the above-prepared polyesters A, B, D and E, rubber compositions were prepared according to the recipe shown in Table 2. For comparison, a rubber composition in which polyester has not incorporated was prepared. The ingredients other than sulfur and the vulcanization accelerator for each rubber composition were mixed and kneaded together at 60° C. for 5 minutes by a 0.8 liter Banbury mixer. Then sulfur and the vulcanization accelerator were added to the kneaded mixture and the mixture was kneaded at 60° C. by a 6 inch roll. A unvulcanized rubber of a sheet form was taken out from the roll. The rubber sheet was vulcanized by heating it at a temperature of 160° C. for 15 minutes under a pressure of 100 kg/cm² by using a press obtain a square vulcanized rubber sheet having a size of 150 mm×80 mm×2 mm.

The vulcanized rubber sheet was cut into a size of 75 mm×80 mm×2 mm, and the surface thereof was coated with an epoxy adhesive ("Bond MOS 1010" supplied by Konishi K.K.) at a thickness of 300 μm. The coating film was dried at 60° C. for 3 hours and further allowed to stand for 96 hours to obtain a testing specimen.

Adhesion of the coated rubber sheet specimen was evaluated. The evaluation results are shown in Table 2.

TABLE 2

|  | Example | | | Comparative Exam. | Example |
| --- | --- | --- | --- | --- | --- |
|  | 5 | 6 | 7 | 2 | 8 |
| Rubber EPDM *1 | 100 | 100 | 100 | 100 | 100 |
| Carbon black (Seast 116) *2 | 50 | 50 | 50 | 50 | 50 |
| Oil (Diana Process PW380) *3 | 60 | 60 | 60 | 70 | 60 |
| Zinc oxide #1 | 5 | 5 | 5 | 5 | 5 |
| Stearic acid | 1 | 1 | 1 | 1 | 1 |
| Sodium hydrogencarbonate | 60 | 60 | 60 | 60 | 60 |
| Sulfur (325) | 1.00 | 1.00 | 1.00 | 1.00 | 1.00 |
| Vulcanization accelerator |  |  |  |  |  |
| MBT *5 | 1.00 | 1.00 | 1.00 | 1.00 | 1.00 |
| MBTS *6 | 1.00 | 1.00 | 1.00 | 1.00 | 1.00 |
| TMTD *7 | 0.75 | 0.75 | 0.75 | 0.75 | 0.75 |
| DPPTT *8 | 0.50 | 0.50 | 0.50 | 0.75 | 0.50 |
| Polyester | A | B | D | — | E |
|  | 10 | 10 | 10 |  | 10 |
| Bond strength (kgf/cm) | 1.0 | 1.1 | 1.1 | 0.1 | 0.4 |

*1 Mitsui Chemicals Inc., 3070
*2 Tokai Carbon Co., Ltd.
*3 Idemitsu Kosan Co., Ltd.
*5 2-mercaptobenzothiazole
*6 dibenzothiazyl disulfide
*7 tetramethylthiuram disulfide
*8 dipentamethylenethiuram tetrasulfide
*9 Mitsui Chemicals Inc.

EXAMPLES 9, 10, COMPARATIVE EXAMPLE 3

According to the recipe shown in Table 3, the respective ingredients were mixed together by a Henschel mixer, and the mixture was melted and kneaded by a twin screw extruder to obtain a polymer composition of a pellet form.

A specimen used for adhesion test was prepared as follows. The polymer pellet was injection-molded into a specimen having a size of 50 mm×80 mm×3.1 mm. The specimen was coated with a primer ("RB-197" supplied by Nippon Bee Chemical Co., Ltd.) at a coating thickness of 10 μm, and the coating film was dried at 80° C. for 10 minutes. Urethane metallic coating material ("RB-212" supplied by Nippon Bee Chemical Co., Ltd.) and Urethane clear coating material ("RB-288" supplied by Nippon Bee Chemical Co., Ltd.) were prepared according the specification described by Nippon Bee Chemical Co., Ltd. The primer-coated specimen was coated with two urethane coating materials at thicknesses of 20 μm and 25 μm, respectively, and then, the coating films were dried at 80° C. for 45 minutes, and the coated specimen was allowed to stand for 24 hours to obtain a testing specimen.

Bond strength of the coated polymer specimen was evaluated. The results are shown in Table 3.

TABLE 3

|  | Examples | | | | Comparative Examples | |
| --- | --- | --- | --- | --- | --- | --- |
|  | 9 | parts | 10 | parts | 3 | parts |
| Resin | PP *1 | 75 | PP *1 | 75 | PP *1 | 75 |
| Rubber | EPR *2 | 12 | EPR *2 | 12 | EPR *2 | 15 |
| Inorganic filler | Talc *3 | 10 | Talc *3 | 10 | Talc *3 | 10 |
| Polyester | A | 3 | C | 3 | — | — |
| Cross cut test | 100/100 |  | 100/100 |  | 30/100 |  |

*1 J 3050 HP (Idemitsu Petrochemical Co., Ltd.) MFR = 42
*2 EP02 (JSR Corp.) MFR = 3.2
*3 Microace P-4 (Nippon Talc Co., Ltd.) average particle diameter 1.5 μm

PRODUCTION EXAMPLE 6

A 500 ml four-necked flask equipped with a stirrer, a thermometer, a reflux condenser, a water-separating tube and a nitrogen gas supplying tube was charged with 166.2 g of terephthalic acid, 181.1 g of 2-butyl-2-ethyl-1,3-propanediol, 34.2 g of pentaerythritol and 0.17 g of tetrabutoxy titanate as a catalyst (OH/COOH equivalent ratio=1.50).

Nitrogen gas was blown into the flask while the content was stirred. While water produced during a reaction and unreacted diol were removed, the temperature was elevated from 160° C. to 240° C. over a period of 6 hours. Thereafter, while the reaction product was dehydrated at a temperature of 240° C. under a reduced pressure of 50 mmHg, the reaction was continued for 4 hours. The thus-obtained polyester (referred to as "polyester F") had an average molecular weight (Mw) of 7,130, an acid value of 0.15 mg KOH/g, a hydroxyl value of 93.5 mg KOH/g, a hydroxyl group number of 12 per molecule and a softening point of 81° C.

PRODUCTION EXAMPLE 7

A 500 ml four-necked flask equipped with a stirrer, a thermometer, a reflux condenser, a water-separating tube and a nitrogen gas supplying tube was charged with 194.2 g of dimethyl terephthalate, 170.5 g of 2-butyl-2-ethyl-1,3-propanediol, 36.1 g of pentaerythritol and, as catalyst, 0.24 g of manganese acetate tetrahydrate and 0.29 g of antimony trioxide (OH/COOH equivalent ratio=1.38).

Nitrogen gas was blown into the flask while the content was stirred. While methanol produced during a reaction and unreacted diol were removed, the temperature was elevated from 160° C. to 240° C. over a period of 6 hours. Thereafter, while the reaction product was dealcoholized at a temperature of 240° C. under a reduced pressure of 50 mmHg, the reaction was continued for 6 hours. The thus-obtained polyester (referred to as "polyester G") had an average molecular weight (Mw) of 11,400, an acid value of 0.15 mg KOH/g, a hydroxyl value of 81.6 mg KOH/g, a hydroxyl group number of 17 per molecule and a softening point of 89° C.

PRODUCTION EXAMPLE 8

A 1,000 ml four-necked flask equipped with a stirrer, a thermometer, a reflux condenser, a water-separating tube and a nitrogen gas supplying tube was charged with 388.4 g of dimethyl isophthalate, 264.6 g of 2,2-diethyl-1,3-propanediol, 67.2 g of trimethylolpropane, and 0.20 g of monobutyltin oxide as a catalyst (OH/COOH equivalent ratio=1.37).

Nitrogen gas was blown into the flask while the content was stirred. While methanol produced during a reaction and unreacted diol were removed, the temperature was elevated from 160° C. to 240° C. over a period of 6 hours. Thereafter, while the reaction product was dealcoholized at a temperature of 240° C. under a reduced pressure of 50 mmHg, the reaction was continued for 3 hours. The thus-obtained polyester (referred to as "polyester H") had an average molecular weight (Mw) of 6,830, an acid value of 0.15 mg KOH/g, a hydroxyl value of 83.2 mg KOH/g, a hydroxyl group number of 10 per molecule and a softening point of 76° C.

PRODUCTION EXAMPLE 9

A 1,000 ml four-necked flask equipped with a stirrer, a thermometer, a reflux condenser, a water-separating tube and a nitrogen gas supplying tube was charged with 291.4 g of terephthalic acid, 213.8 g of 2-butyl-2-ethyl-1,3-propanediol, 45.3 g of pentaerythritol and 0.20 g of monobutyltin oxide as a catalyst (OH/COOH equivalent ratio=1.32).

Nitrogen gas was blown into the flask while the content was stirred. While water produced during a reaction and unreacted diol were removed, the temperature was elevated from 160° C. to 240° C. over a period of 6 hours. Thereafter, while the reaction product was dehydrated at a temperature of 240° C. under a reduced pressure of 50 mmHg, the reaction was continued for 8 hours. The thus-obtained polyester (referred to as "polyester I") had an average molecular weight (Mw) of 19,200, an acid value of 0.15 mg KOH/g, a hydroxyl value of 83.2 mg KOH/g, a hydroxyl group number of 29 per molecule and a softening point of 90° C.

PRODUCTION EXAMPLE 10

A 1,000 ml four-necked flask equipped with a stirrer, a thermometer, a reflux condenser, a water-separating tube and a nitrogen gas supplying tube was charged with 388.4 g of dimethyl terephthalate, 377.2 g of 2-butyl-2-ethyl-1,3-propanediol, 35.0 g of trimethylolpropane and 0.20 g of monobutyltin oxide as a catalyst (OH/COOH equivalent ratio=1.32).

Nitrogen gas was blown into the flask while the content was stirred. While methanol produced during a reaction and unreacted diol were removed, the temperature was elevated from 160° C. to 240° C. over a period of 6 hours. Thereafter, while the reaction product was dealcoholized at a temperature of 240° C. under a reduced pressure of 50 mmHg, the reaction was continued for 2 hours. The thus-obtained polyester (referred to as "polyester J") had an average molecular weight (Mw) of 5,040, an acid value of 0.15 mg KOH/g, a hydroxyl value of 66.2 mg KOH/g, a hydroxyl group number of 6 per molecule and a softening point of 71° C.

PRODUCTION EXAMPLE 11

A 1,000 ml four-necked flask equipped with a stirrer, a thermometer, a reflux condenser, a water-separating tube and a nitrogen gas supplying tube was charged with 388.4 g of dimethyl isophthalate, 387.1 g of 2,2-diethyl-1,3-propanediol and 0.20 g of monobutyltin oxide as a catalyst (OH/COOH equivalent ratio=1.25).

Nitrogen gas was blown into the flask while the content was stirred. While methanol produced during a reaction and unreacted diol were removed, the temperature was elevated from 160° C. to 240° C. over a period of 6 hours. Thereafter, while the reaction product was dealcoholized at a temperature of 240° C. under a reduced pressure of 50 mmHg, the reaction was continued for 2 hours. The thus-obtained polyester (referred to as "polyester K") had an average molecular weight (Mw) of 4,140, an acid value of 0.15 mg KOH/g, a hydroxyl value of 53.6 mg KOH/g, a hydroxyl group number of 4 per molecule and a softening point of 56° C.

PRODUCTION EXAMPLE 12

A 500 ml four-necked flask equipped with a stirrer, a thermometer, a reflux condenser, a water-separating tube and a nitrogen gas supplying tube was charged with 194.2 g of dimethyl terephthalate, 225.8 g of 2-butyl-2-ethyl-1,3-propanediol and, as catalyst, 0.24 g of manganese acetate tetrahydrate and 0.29 g of antimony trioxide (OH/COOH equivalent ratio=1.40).

Nitrogen gas was blown into the flask while the content was stirred. While methanol produced during a reaction and from unreacted diol were removed, the temperature was elevated from 160° C. to 240° C. over a period of 6 hours. Thereafter, while the reaction product was dealcoholized at a temperature of 240° C. under a reduced pressure of 50 mmHg, the reaction was continued for 2 hours. The thus-obtained polyester (referred to as "polyester L") had an average molecular weight (Mw) of 2,100, an acid value of 0.15 mg KOH/g, a hydroxyl value of 103.1 mg KOH/g, and a softening point of 36° C.

PRODUCTION EXAMPLE 13

(PRODUCTION OF COMPARATIVE POLYESTER)

A 500 ml four-necked flask equipped with a stirrer, a thermometer, a reflux condenser, a water-separating tube and a nitrogen gas supplying tube was charged with 194.2 g of dimethyl terephthalate, 147.8 g of 1,6-hexanediol and, as catalyst, 0.24 g of manganese acetate tetrahydrate and 0.29 g of antimony trioxide (OH/COOH equivalent ratio=1.25).

Nitrogen gas was blown into the flask while the content was stirred. While methanol produced during a reaction and from unreacted diol were removed, the temperature was elevated from 160° C. to 240° C. over a period of 6 hours. Thereafter, while the reaction product was dealcoholized at a temperature of 240° C. under a reduced pressure of 50 mmHg, the reaction was continued for 3 hours. The thus-obtained polyester (referred to as "polyester M") had an average molecular weight (Mw) of 4,430, an acid value of 0.15 mg KOH/g, a hydroxyl value of 50.6 mg KOH/g, a hydroxyl group number of 2 per molecule and a softening point of 66° C.

EXAMPLES 11–17, COMPARATIVE EXAMPLES 4, 5

Using the above-prepared polyesters, resin compositions were prepared according to the recipe shown in Table 4. The ingredients for each resin composition were mixed by a Henschel, and then melted and kneaded together at 220° C. by using a twin screw extruder ("ZE40A" supplied by Hermann Bestorff Machinenbau GmbH, the length 1,340 mm, L/D=33.5) to prepare a resin composition of a pellet form. The pellet was injection-molded into a square specimen having a size of 150 mm×150 mm×2.4 mm (thickness) by using an injection molding machine ("F85" supplied by Klöckner Ferromatic Desma GmbH) at a mold temperature of 45° C., a nozzle temperature of 210° C., an injection pressure of 550 kg/cm$^2$ and a dwell pressure of 450 kg/cm$^2$. The appearance of the square specimen was visually observed to determine whether a laminar separation occurred or not whereby the compatibility of the resin with the polyester was evaluated.

The specimen was coated with a primer ("RB-197" supplied by Nippon Bee Chemical Co., Ltd.) at a coating thickness of 10 μm, and the coating film was dried at 80° C. for 10 minutes. Urethane metallic coating material ("RB-212" supplied by Nippon Bee Chemical Co., Ltd.) and Urethane clear coating material ("RB-288" supplied by Nippon Bee Chemical Co., Ltd.) were prepared according the specification provided by Nippon Bee Chemical Co., Ltd. The primer-coated specimen was coated with two urethane coating materials at thicknesses of 20 μm and 25 μm, respectively, and then, the coating films were dried at 80° C. for 45 minutes, and the coated specimen was allowed to stand for 24 hours to obtain a testing coated resin specimen. Properties of the coated resin specimen were evaluated. The results are shown in Table 4.

TABLE 4

|  | Examples | | | | | | | Comparative Examples | |
| --- | --- | --- | --- | --- | --- | --- | --- | --- | --- |
|  | 11 | 12 | 13 | 14 | 15 | 16 | 17 | 4 | 5 |
| Composition (parts) | | | | | | | | | |
| Polypropyrene *1 | 87 | 87 | 87 | 87 | 87 | 87 | 87 | 87 | 90 |
| Talc *2 | 10 | 10 | 10 | 10 | 10 | 10 | 10 | 10 | 10 |
| Polyester F | 3 | — | — | — | — | — | — | — | — |
| Polyester G | — | 3 | — | — | — | — | — | — | — |
| Polyester H | — | — | 3 | — | — | — | — | — | — |
| Polyester I | — | — | — | 3 | — | — | — | — | — |
| Polyester J | — | — | — | — | 3 | — | — | — | — |
| Polyester K | — | — | — | — | — | 3 | — | — | — |
| Polyester L | — | — | — | — | — | — | 3 | — | — |
| Polyester M | — | — | — | — | — | — | — | 3 | — |
| Compatibility | A | A | A | A | A | A | A | B | A |
| Film strength | 100 | 100 | 100 | 100 | 90 | 80 | 50 | *3 | 10 |
| Solvent resistance (min) | >60 | >60 | >80 | >60 | 40–50 | 30—40 | 10–20 | *3 | <5 |

*1 J-3050 HP (Idemitsu Petrochemical Co., Ltd.)
*2 Microace P4 (average particle diameter 1.5 μm; Nippon Talc Co., Ltd.)
*3 Can not be determined As seen from Table 4, in the examples of the invention (Examples 11 to 15) wherein polyesters F through J of the present invention were incorporated, the resin compositions exhibited excellent compatibility between the resin and the polyester, and excellent adhesion to and coatability with a coating film. Especially when polyesters F through I having a hydroxyl value of at least 70 mg KOH/g were used, the adhesion and coatability were improved to a greater extent. In contrast, when polyesters K and L having a low molecular weight or a small hydroxyl value were used, the improvement of the coatability was minor (Examples 16, 17); and when polyester M not containing a hindered glycol was used, both of the compatibility of the polyester with a resin, and the adhesion of the resin/polyester composition are poor (Comparative Example 4).

PRODUCTION EXAMPLE 14

A 500 ml four-necked flask equipped with a stirrer, a thermometer, a reflux condenser, a water-separating tube and a nitrogen gas supplying tube was charged with 358.8 g of terephthalic acid, 348.1 g of 2-butyl-2-ethyl-1,3-propanediol, 73.8 g of pentaerythritol and 0.26 g of monobutyltin oxide as a catalyst (OH/COOH equivalent ratio=1.25).

Nitrogen gas was blown into the flask while the content was stirred and the temperature of the content was elevated to 180° C. While water produced during a reaction and unreacted diol were removed, the temperature was elevated from 180° C. to 240° C. over a period of 3 hours. Thereafter, while the reaction product was dehydrated at a temperature of 240° C., the reaction was conducted for 5 hours. Finally, under a reduced pressure of 50 mmHg, the reaction was continued for 3 hours. The thus-obtained polyester (referred to as "polyester W") had an average molecular weight (Mw) of 10,200, an acid value of 0.3 mg KOH/g and a hydroxyl value of 88.9 mg KOH/g.

PRODUCTION EXAMPLE 15

A 500 ml four-necked flask equipped with a stirrer, a thermometer, a reflux condenser, a water-separating tube and a nitrogen gas supplying tube was charged with 358.8 g of terephthalic acid, 278.2 g of 2-butyl-2-ethyl-1,3-propanediol, 45.2 g of neopentyl glycol, 73.8 g of pentaerythritol and 0.26 g of monobutyltin oxide as a catalyst (OH/COOH equivalent ratio=1.25).

Nitrogen gas was blown into the flask while the content was stirred and the temperature of the content was elevated to 180° C. While methanol produced during a reaction and unreacted diol were removed, the temperature was elevated from 180° C. to 240° C. over a period of 3 hours. Thereafter, while the reaction product was dehydrated at a temperature of 240° C., the reaction was conducted for 5 hours. Finally, under a reduced pressure of 50 mmHg, the reaction was continued for 3 hours. The thus-obtained polyester (referred to as "polyester X") had an average molecular weight (Mw) of 12,300, an acid value of 0.3 mg KOH/g and a hydroxyl value of 85.3 mg KOH/g.

PRODUCTION EXAMPLE 16

A 1,000 ml four-necked flask equipped with a stirrer, a thermometer, a reflux condenser, a water-separating tube and a nitrogen gas supplying tube was charged with 358.8 g of terephthalic acid, 260.1 g of 2-butyl-2-ethyl-1,3-propanediol, 80.4 g of glycerol and 0.26 g of monobutyltin oxide as a catalyst (OH/COOH equivalent ratio=1.15).

Nitrogen gas was blown into the flask while the content was stirred and the temperature of the content was elevated to 180° C. While methanol produced during a reaction and unreacted diol were removed, the temperature was elevated from 180° C. to 240° C. over a period of 3 hours. Thereafter, while the reaction product was dehydrated at a temperature of 240° C., the reaction was conducted for 5 hours. Finally, under a reduced pressure of 50 mmHg, the reaction was continued for 3 hours. The thus-obtained polyester (referred to as "polyester Y") had an average molecular weight (Mw) of 12,400, an acid value of 0.3 mg KOH/g and a hydroxyl value of 98.9 mg KOH/g.

EXAMPLES 18–20, COMPARATIVE EXAMPLE 6

Using the above-prepared polyesters W, X and Y, rubber compositions were prepared according to the recipe shown in Table 5. For comparison, a rubber composition not containing a polyester was prepared (Comparative Example 6). The ingredients for each rubber composition, other than sulfur and the vulcanization accelerator, were kneaded together by using a Brabender-type Banbury mixer at 80° C. for 5 minutes, and then, sulfur and the vulcanization accelerator were added and kneaded together at 80° C. for 5 minutes by using a 6 inch roll. Thereafter the kneaded mixture was extruded through an extruder (L/D=70, diameter=75 mm) into an extrudate having a square cross-section of width 30 mm and a thickness of 5 mm. The extrudate was vulcanized at 200° C. for 5 minutes.

The surface of the vulcanized product was coated with an urethane coating material ("Soflex 2500" supplied by Kansai Paint Co.) by spraying, and the coating film was cured at 100° C. in a hot air oven for 15 minutes. The adhesion of the coating film to the vulcanized product was evaluated by the cross cut adhesion test and measurement of the bond strength. The results are shown in Table 5.

TABLE 5

|  | Example | | | Comparative Exam. |
|---|---|---|---|---|
|  | 18 | 19 | 20 | 6 |
| Rubber Composition | | | | |
| EPDM *1 | 92 | 90 | 90 | 100 |
| Kinds of Polyester | W | X | Y | — |
| Polyester modifier | 8 | 10 | 10 | — |
| Carbon black *2 | 67.5 | 67.5 | 67.5 | 67.5 |
| Oil *3 | 35.0 | 35.0 | 35.0 | 35.0 |
| Zinc oxide #1 | 5 | 5 | 5 | 5 |
| Stearic acid | 1 | 1 | 1 | 1 |
| Sulfur | 1.5 | 1.5 | 1.5 | 1.5 |
| Vulcanization accelerator | | | | |
| Mercaptobenzothiazol | 2.0 | 2.0 | 2.0 | 2.0 |
| Film adhesion | | | | |
| Adhesion (%) | 100 | 95 | 98 | 0 |
| Bond strength (kgf/cm) | 1.21 | 0.78 | 0.91 | less than 0.1 |

*1 Esprene 505A (Sumitomo Chemical Company, limited)
*2 FEF grade 40–50 μm
*3 Process oil (PW-380)(Idemitsu Kosan Co., Ltd.)

We claim:

1. A polymer composition comprising a thermoplastic resin or a rubbery polymer and 0.01 to 50 parts by weight, based on 100 parts by weight of the thermoplastic resin or rubbery polymer, of a modifier comprising a polyester having a hydroxyl value of 40 to 250 mgKOH/g and prepared by polycondensation of a polycarboxylic acid ingredient comprising 50 to 100% by weight of an aromatic dicarboxylic acid or a functional derivative thereof and a polyhydric alcohol ingredient comprising 40 to 100% by weight of a hindered glycol represented by the following formula:

$$HOCH_2\text{—}C(R^1R^2)\text{—}CH_2OH \qquad (1)$$

wherein $R^1$ and $R^2$ represent an alkyl group, and the sum of the carbon numbers in $R^1$ and $R^2$ is in the range of 3 to 20.

2. The polymer composition according to claim 1, wherein the polyester has a hydroxyl value of at least 60 mgKOH/g and a weight average molecular weight (Mw) of from 4,000 to 100,000.

3. The polymer composition according to claim 1, wherein the polyester has an average hydroxyl group number (m) per molecule of 40 to 100, as defined by the following formula:

$$m = (\text{hydroxyl value} \times \text{weight average molecular weight})/(56.1 \times 1,000).$$

4. A polyester characterized by having a hydroxyl value of 40 to 250 mgKOH/g, a weight average molecular weight (Mw) of from 4,000 to 100,000, and an average hydroxyl group number (m) per molecule of 40 to 100, as defined by the following formula:

$$m = (\text{hydroxyl value} \times \text{weight average molecular weight})/(56.1 \times 1,000)$$

and prepared by polycondensation of a polycarboxylic acid ingredient comprising 50 to 100% by weight of an aromatic dicarboxylic acid or a functional derivative thereof and a polyhydric alcohol ingredient comprising 40 to 100% by weight of a hindered glycol represented by the following formula:

$$HOCH_2\text{—}C(R^1R^2)\text{—}CH_2OH \qquad (1)$$

wherein $R^1$ and $R^2$ represent an alkyl group, and the sum of the carbon numbers in $R^1$ and $R^2$ is in the range of 3 to 20.

5. The polyester according to claim 4, wherein 0.1 to 60% by weight, based on the total weight of the polycarboxylic acid ingredient and the polyhydric alcohol ingredient, of at least one monomer selected from the group consisting of tri- or more-valent carboxylic acids and functional derivatives thereof, and tri- or more-hydric alcohols, in addition to the aromatic dicarboxylic acids or the functional derivatives thereof and the hindered glycol, is polycondensed.

6. A process for producing a polyester having a hydroxyl value of 40 to 250 mgKOH/g, a weight average molecular weight (Mw) of from 4,000 to 100,000, and an average hydroxyl group number (m) per molecule of 40 to 100, as defined by the following formula:

$$m = (\text{hydroxyl value} \times \text{weight average molecular weight})/(56.1 \times 1,000),$$

wherein a polycarboxylic acid ingredient and a polyhydric alcohol ingredient are polycondensed, characterized in that the polycarboxylic acid ingredient comprises 50 to 100% by weight of an aromatic carboxylic acid or a functional derivative thereof, and the polyhydric alcohol ingredient comprises 40 to 100% by weight of a hindered glycol represented by the following formula:

$$HOCH_2\text{—}C(R^1R^2)\text{—}CH_2OH \qquad (1)$$

wherein $R^1$ and $R^2$ represent an alkyl group, and the sum of the carbon numbers in $R^1$ and $R^2$ is in the range of 3 to 20; and 0.1 to 60% by weight, based on the total weight of the polycarboxylic acid ingredient and the polyhydric alcohol ingredient, of at least one tri- or more-valent monomer selected from the group consisting of tri- or more-valent carboxylic acids and functional derivatives thereof, and tri- or more-hydric alcohols, in addition to the aromatic dicarboxylic acids or the functional derivatives thereof and the hindered glycol, is polycondensed.

7. The process for producing a polyester according to claim 6, wherein the ratio of the total number of hydroxyl groups (X) to the total number of carboxylic acid reactive groups (Y) is at least 1.02 as an equivalent ratio of (X)/(Y).

8. A shaped article made of the polymer composition claimed in claim 1 and having a coating formed on the surface thereof.

* * * * *